(12) United States Patent
Inoue et al.

(10) Patent No.: US 9,146,370 B2
(45) Date of Patent: Sep. 29, 2015

(54) OPTICAL CABLE HOLDING DEVICE AND ELECTRONIC DEVICE

(71) Applicant: FUJITSU LIMITED, Kawasaki-shi, Kanagawa (JP)

(72) Inventors: Takashi Inoue, Hanyu (JP); Kenji Tsutsumi, Kawasaki (JP); Junichi Hayama, Kawasaki (JP); Kenji Toshimitsu, Sagamihara (JP); Kazuo Fujita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 56 days.

(21) Appl. No.: 14/141,888

(22) Filed: Dec. 27, 2013

(65) Prior Publication Data
US 2014/0226947 A1    Aug. 14, 2014

(30) Foreign Application Priority Data
Feb. 8, 2013    (JP) .................................. 2013-023696

(51) Int. Cl.
*G02B 6/00* (2006.01)
*G02B 6/44* (2006.01)

(52) U.S. Cl.
CPC ........................................ *G02B 6/44* (2013.01)

(58) Field of Classification Search
CPC .. G02B 6/4471; G02B 6/4452; G02B 6/3897; G02B 6/3887; G02B 6/3636; G02B 6/00
USPC .......................... 385/134, 135, 136, 137, 138
See application file for complete search history.

(56) References Cited

U.S. PATENT DOCUMENTS 4,765,560 A * 8/1988 Branback ....................... 242/129

FOREIGN PATENT DOCUMENTS

JP    62-164005    7/1987

* cited by examiner

*Primary Examiner* — Jennifer Doan
(74) *Attorney, Agent, or Firm* — Staas & Halsey LLP

(57) ABSTRACT

An optical cable holding device includes a central shaft section fixed to a substrate in such a way as to stand on the substrate, a plurality of flexible holding feet that are disposed in such a way as to spread radially from the central shaft section, each flexible holding foot extending from a base end on a side where the central shaft section is located, toward a side where the substrate is located and being bent in such a way as to get away from the central shaft section as the flexible holding foot gets closer to a tip which is a free end, and a plurality of cable holders that are disposed independently of the substrate at the tips of the flexible holding feet and hold an optical cable.

18 Claims, 22 Drawing Sheets

OPTICAL CABLE HOLDING DEVICE AND ELECTRONIC DEVICE

CROSS-REFERENCE TO RELATED APPLICATION

This application is based upon and claims the benefit of priority of the prior Japanese Patent Application No. 2013-023696, filed on Feb. 8, 2013, the entire contents of which are incorporated herein by reference.

FIELD

The embodiment discussed herein is related to an optical cable holding device provided with a plurality of cable holders that hold an optical cable and to an electronic device.

BACKGROUND

In the past, an optical cable has been provided with a given radius of curvature to avoid characteristic degradation and damage. Therefore, when an extra length of the optical cable is handled, the optical cable is coiled into a loop.

As a mechanism for handling an extra length of an optical cable, a mechanism provided with slits radially provided in a mounting plate, a sliding section that is slid able back and forth along each slit, and a cable holder attached to the sliding section is known (see, for example, Japanese Laid-open Patent Publication No. 62-164005).

FIG. 21 is a perspective view for describing an example of handling of an extra length of an optical cable.

FIGS. 22 to 24 are front views for describing an example of a method for unlocking a cable holder.

As depicted in FIG. 21, to the input and output side of an optical module 602 placed on a substrate 601, an optical cable 200 is connected. The optical cable 200 is held by a plurality of cable holders 603 disposed on the substrate 601. Moreover, an extra length of the optical cable 200 is handled by being coiled into a loop by the optical module 602.

The cable holders 603 are fixed to the substrate 601. The cable holders 603 are mounted on the substrate 601 in advance to provide a given radius of curvature of the optical cable 200. Moreover, to absorb extra length tolerances of the optical cable 200 by moving the cable holders 603, extra mounting holes for the cable holders 603 are provided in the substrate 601.

As depicted in FIGS. 22 to 24, when the optical cable 200 is taken out of the cable holders 603, lids 603b fitted in holder main bodies 603a are individually unlocked by a human hand 604.

Incidentally, with an increase in traffic, the density of communication devices is increasing year after year and demand for smaller communication devices has grown recently. As a result, the sizes of devices on a printed-wiring board increasingly become smaller, and the number of optical cables handled on the printed-wiring board is increased.

Therefore, as in the above-described mechanism for handling an extra length of an optical cable, in a mechanism in which slits and sliding sections are provided in a mounting plate and cable holders are attached to the sliding sections, a component mounting area and a pattern area are limited on the substrate which is the mounting plate. This hinders high-density mounting.

Moreover, the plurality of cable holders 603 depicted in FIGS. 21 to 24 are disposed in accordance with the route of the optical cable 200. This increases the number of places where the cable holders 603 are fixed to the substrate 601 and accordingly limits the component mounting area. As a result, high-density mounting of the substrate 601 is hindered.

SUMMARY

According to an aspect of the embodiments, an optical cable holding device includes a central shaft section fixed to a substrate in such a way as to stand on the substrate, a plurality of flexible holding feet that are disposed in such a way as to spread radially from the central shaft section, each flexible holding foot extending from a base end on a side where the central shaft section is located, toward a side where the substrate is located and being bent in such a way as to get away from the central shaft section as the flexible holding foot gets closer to a tip which is a free end, and a plurality of cable holders that are disposed independently of the substrate at the tips of the flexible holding feet and hold an optical cable.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Hereinafter, an optical cable holding device and an electronic device according to an embodiment will be described.

Figure 1:
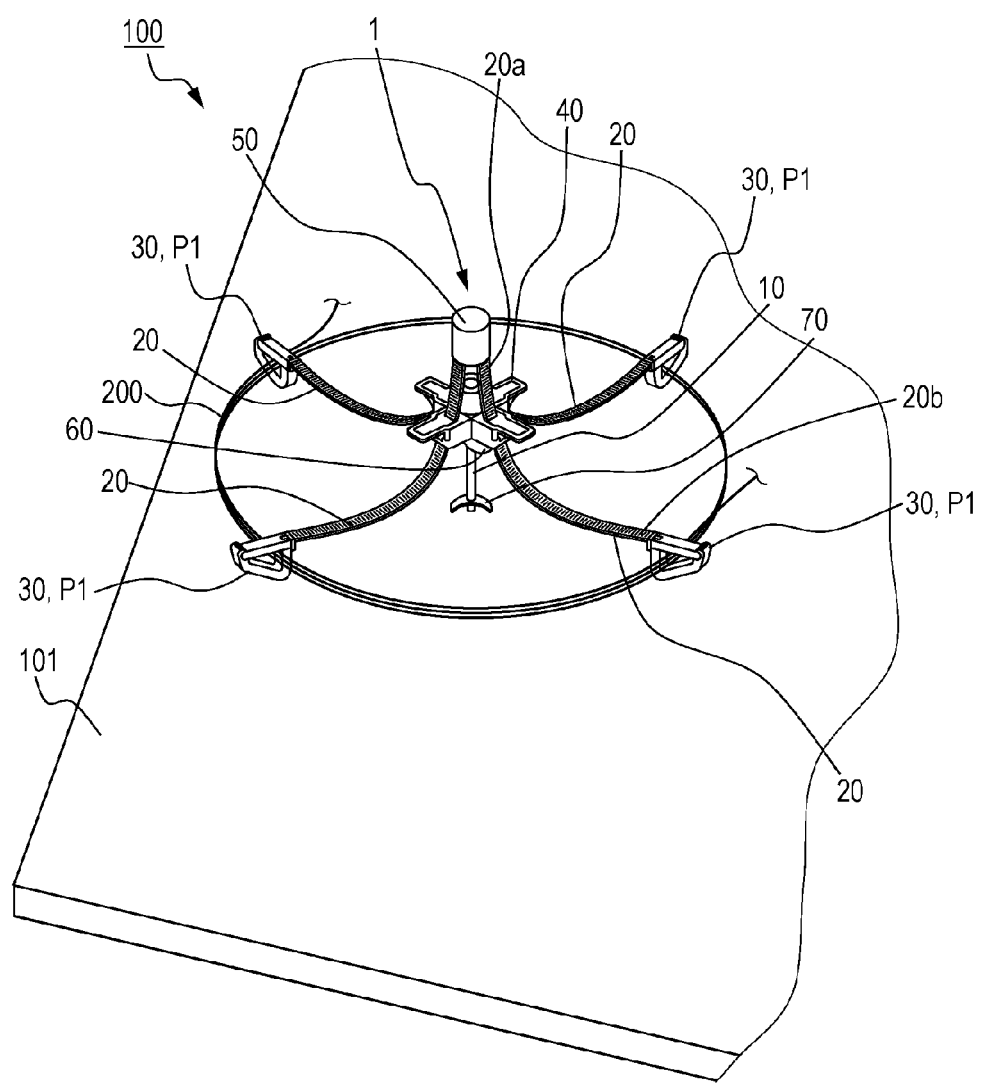
FIG. 1 is a perspective view depicting an electronic device according to an embodiment.

FIG. 1 is a perspective view depicting an electronic device 100 according to the embodiment.

Figure 2A:
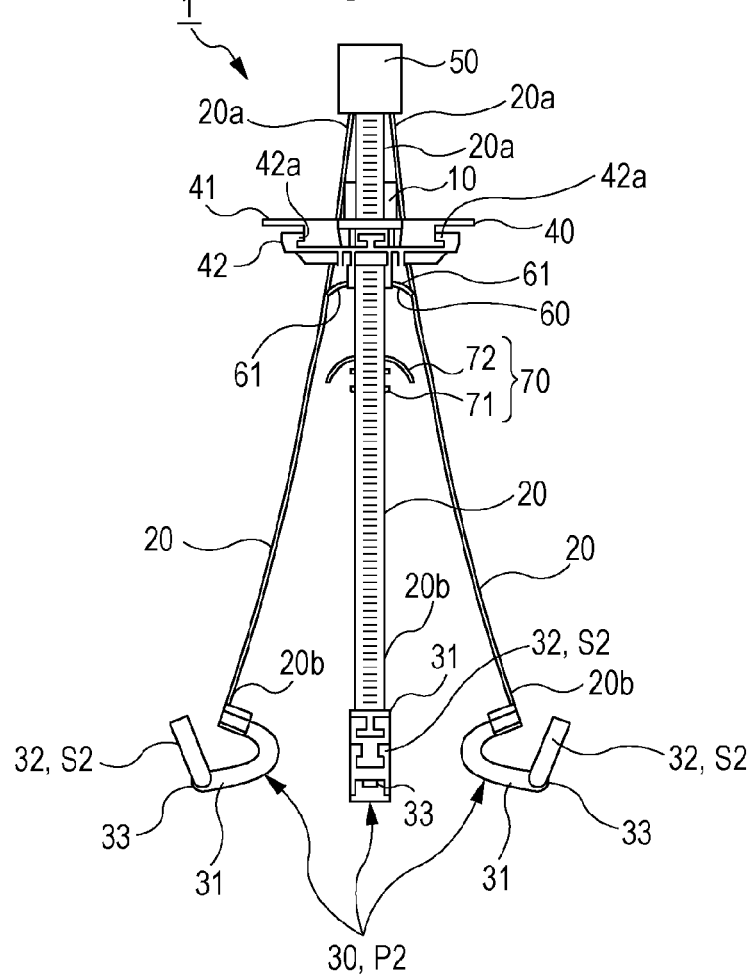
FIG. 2A is a front view depicting an optical cable holding device according to the embodiment.
Figure 2B:
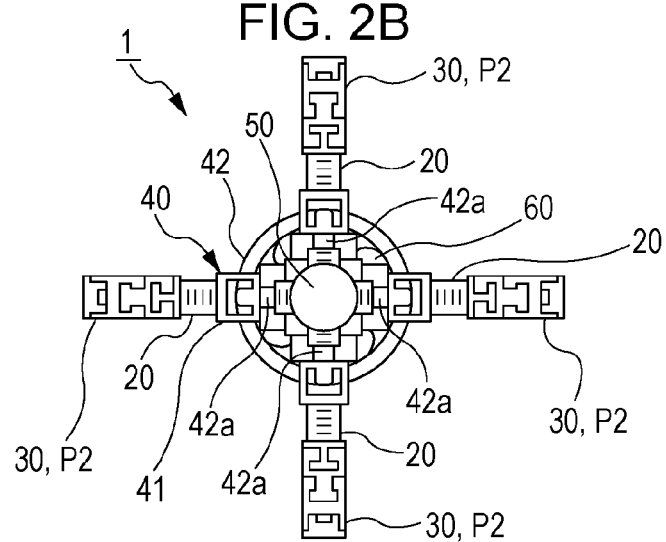
FIG. 2B is a plan view depicting the optical cable holding device according to the embodiment.

FIGS. 2A and 2B are a front view and a plan view, respectively, depicting an optical cable holding device 1 according to the embodiment.

Figure 3A:
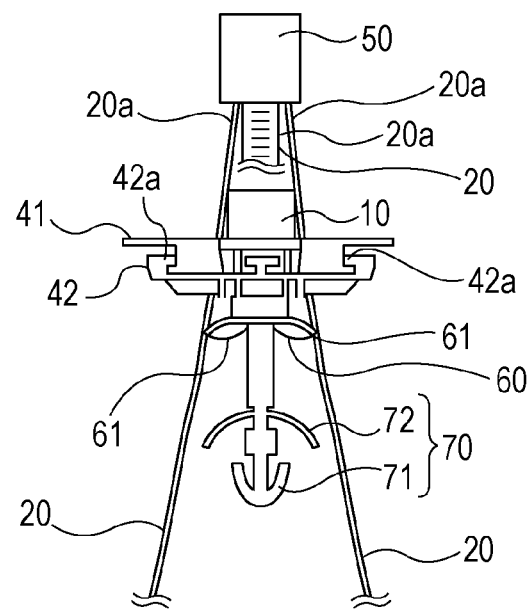
FIG. 3A is a front view depicting the optical cable holding device according to the embodiment with part of holding feet and cable holders omitted therefrom.
Figure 3B:
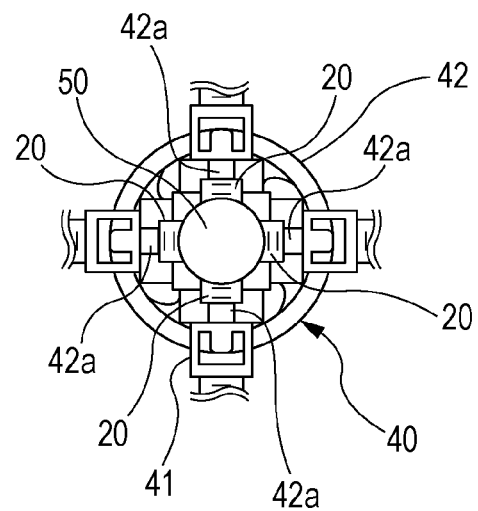
FIG. 3B is a plan view depicting the optical cable holding device according to the embodiment with part of the holding feet and the cable holders omitted therefrom.

FIGS. 3A and 3B are a front view and a plan view, respectively, depicting the optical cable holding device 1 with part of holding feet 20 and cable holders 30 omitted therefrom.

As depicted in FIG. 1, the electronic device 100 includes the optical cable holding device 1 and a substrate 101.

As depicted in FIGS. 1 to 3B, the optical cable holding device 1 includes a central shaft section 10, a plurality of holding feet 20, and a plurality of cable holders 30 and holds an optical cable 200 depicted in FIG. 1. The optical cable holding device 1 may further include holding feet adjusting section 40, a grip section 50, a holding feet pressing section 60, and a substrate fixing section 70. The material of the optical cable holding device 1 is, for example, resin. The materials of the component elements of the optical cable holding device 1 may be different from one another.

The optical cable 200 optically connects a first connecting section of an optical module or the like inside the substrate 101 and a second connecting section outside the substrate 101 or the electronic device 100, but the optical cable 200 may optically connect, for example, a plurality of connecting sections inside the substrate 101 or the electronic device 100.

The central shaft section 10 is fixed to the substrate 101 in such a way as to stand thereon. By making the diameter of a part of the central shaft section 10 above the holding feet adjusting section 40 larger than the diameter of a part of the central shaft section 10 below the holding feet adjusting section 40, the large-diameter part of the central shaft section 10 may guide the holding feet 20, which will be described later, with the part above the holding feet adjusting section 40.

The holding feet 20 are disposed in such a way as to spread radially from the central shaft section 10, extend from base ends 20a on the side where the central shaft section 10 is located toward the side where the substrate 101 is located, and are bent in such a way as to get away from the central shaft section 10 as the holding feet 20 get closer to tips 20b which are free ends.

The holding feet 20 each have, for example, a belt-like shape. The plurality of holding feet 20 are collectively tied in a bundle at the base ends 20a by a grip section 50 which is an example of a base end fixing section.

The holding feet 20 have flexibility. The material of the holding feet 20 is not limited to a particular material as long as the material is bendable to a considerable extent. An example of the material of the holding feet 20 is resin such as nylon.

The number of holding feet 20 is, for example, four. The number of holding feet 20 has only to be plural. It goes without saying that more holding feet 20 are preferable when the sole aim is to hold reliably the optical cable 200 coiled into a loop and fewer holding feet 20 are preferable when the sole aim is to simplify the structure.

Figure 4:
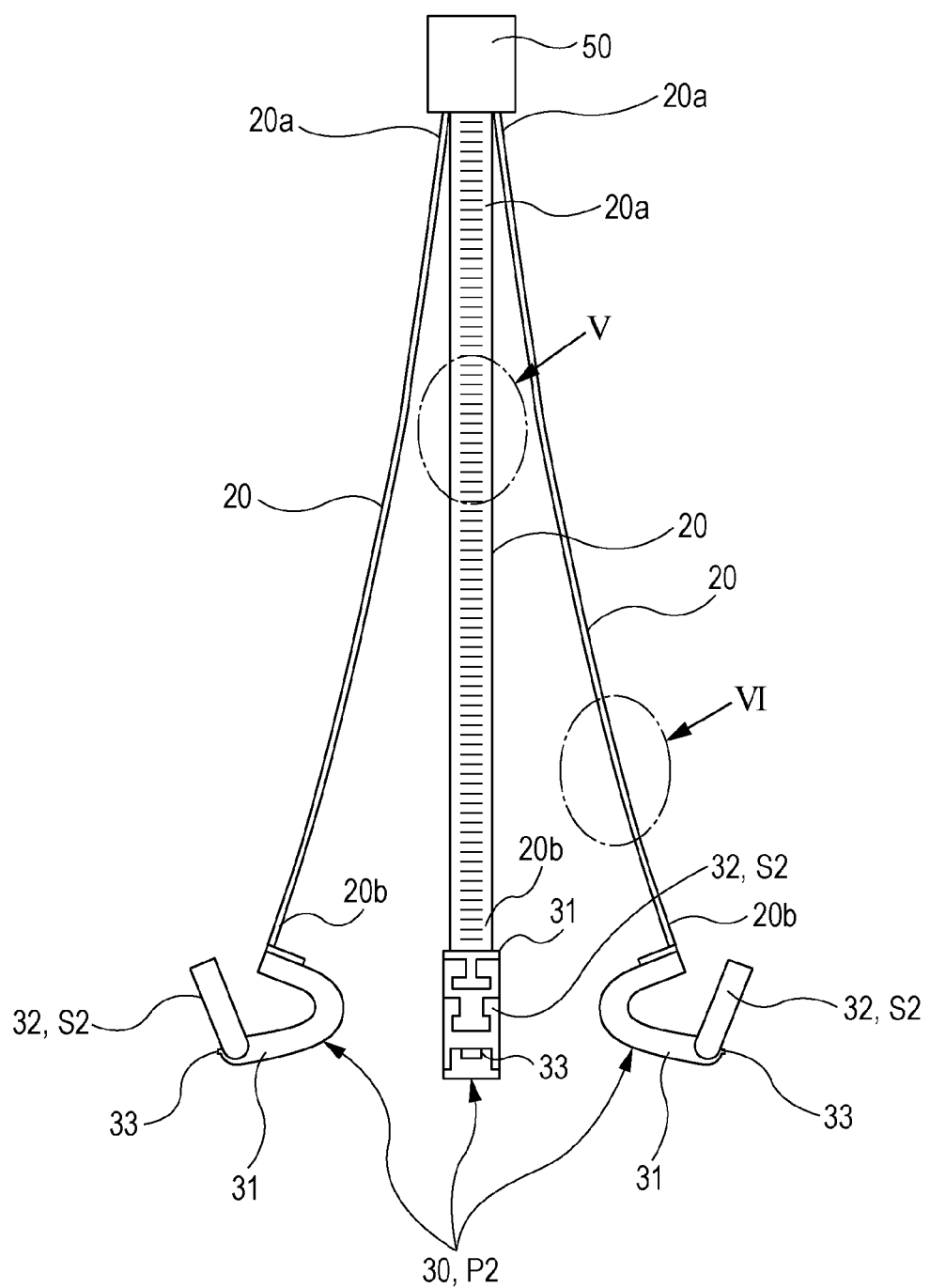
FIG. 4 is a front view (a side view) depicting the holding feet and so forth in the embodiment.
Figure 5:
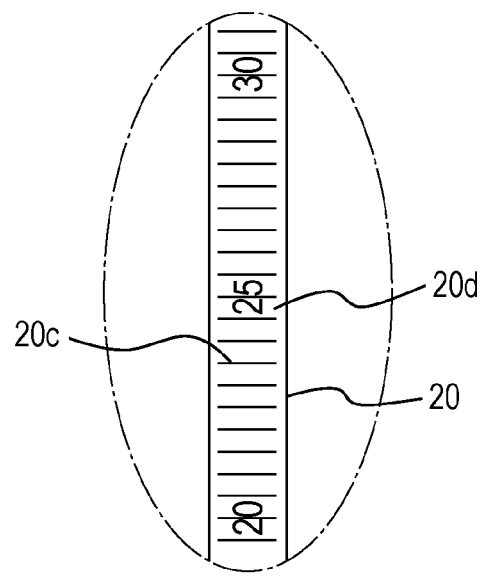
FIG. 5 is an enlarged view of a V part of FIG. 4.
Figure 6:
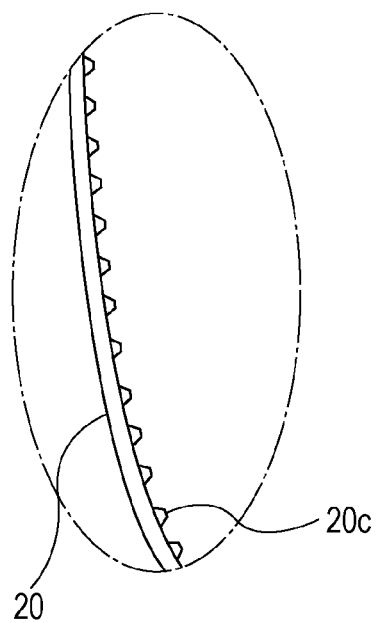
FIG. 6 is an enlarged view of a VI part of FIG. 4.

As depicted in FIG. 5 (an enlarged view of a V part of FIG. 4) and FIG. 6 (an enlarged view of a VI part of FIG. 4), the holding foot 20 includes projections and depressions 20c formed at least in part in a length direction in which the base end 20a and the tip 20b are connected. The projections and depressions 20c are formed by disposing a plurality of projections in the length direction at intervals, for example. However, as the projections and depressions 20c, for example, a plurality of depressions provided in the length direction at intervals or projections and depressions provided alternately and continuously may be adopted.

As will be described in detail later, the projections and depressions 20c are fixed by engaging an engaging section 42 of the holding feet adjusting section 40. The projections and depressions 20c may be provided only in an area in the length direction, the area in which the projections and depressions 20c engage the engaging section 42.

As depicted in FIG. 5, the holding foot 20 includes tick marks 20d formed at least in part in the length direction. Each tick mark 20d indicates the radius of the optical cable 200 held by the plurality of cable holders 30.

The radius of the optical cable 200 is the length between a position inside each cable holder 30 and a position in which a virtual plane parallel to the substrate 101 including the position inside the cable holder 30 and the central shaft section 10 intersect when each cable holder 30 is in a position P1 in which the cable is held, which will be described later, as depicted in FIG. 1. However, for example, even when each tick mark 20d indicates the length from the position of the tip 20b of the holding foot 20, since the length is roughly the same as the radius of the cable holder 30, the length may be said to indicate the radius of the cable holder 30. Moreover, the tick marks 20d may be a tick mark 20d that indicates, with one line, for example, the boundary between an area in which the optical cable 200 fits inside a predetermined permissible radius of curvature and an area in which the optical cable 200 does not fit inside the predetermined permissible radius of curvature when each cable holder 30 is in the position P1 in which the cable is held. The tick mark 20*d* in this case may be said to indicate information regarding the radius of the optical cable 200. Incidentally, the optical cable 200 is sometimes coiled into an elliptic shape. In such a case, the radius of the optical cable 200 corresponds to the long radius of the optical cable 200 in a holding foot 20 on the major axis side and corresponds to the short radius of the optical cable 200 in a holding foot 20 on the minor axis side.

As depicted in FIGS. 7 to 12, the cable holders 30 each include a holder main body 31 and a lid 32.

The cable holders 30 are in the position P1 in which the cable is held as depicted in FIG. 1, the position P1 in which the tips 20*b* of the holding feet 20 are disposed in such a way as to spread and get away from the central shaft section 10. Moreover, the cable holders 30 are in a position P2 in which the cable is not held as depicted in FIGS. 2A and 4, the position in which the tips 20*b* of the holding feet 20 are closer to the central shaft section 10 than in the position P1 in which the cable is held. The position P1 in which the cable is held and the position P2 in which the cable is not held will be described in detail later.

The cable holders 30 hold the optical cable 200 coiled into a loop, for example. Since the tips 20*b* of the holding feet 20 are free ends, the cable holders 30 are disposed independently of the substrate 101 at the tips 20*b* of the holding feet 20 (that is, without being fixed to the substrate 101 irrespective of whether the cable holders 30 are movable or not).

Figure 7:
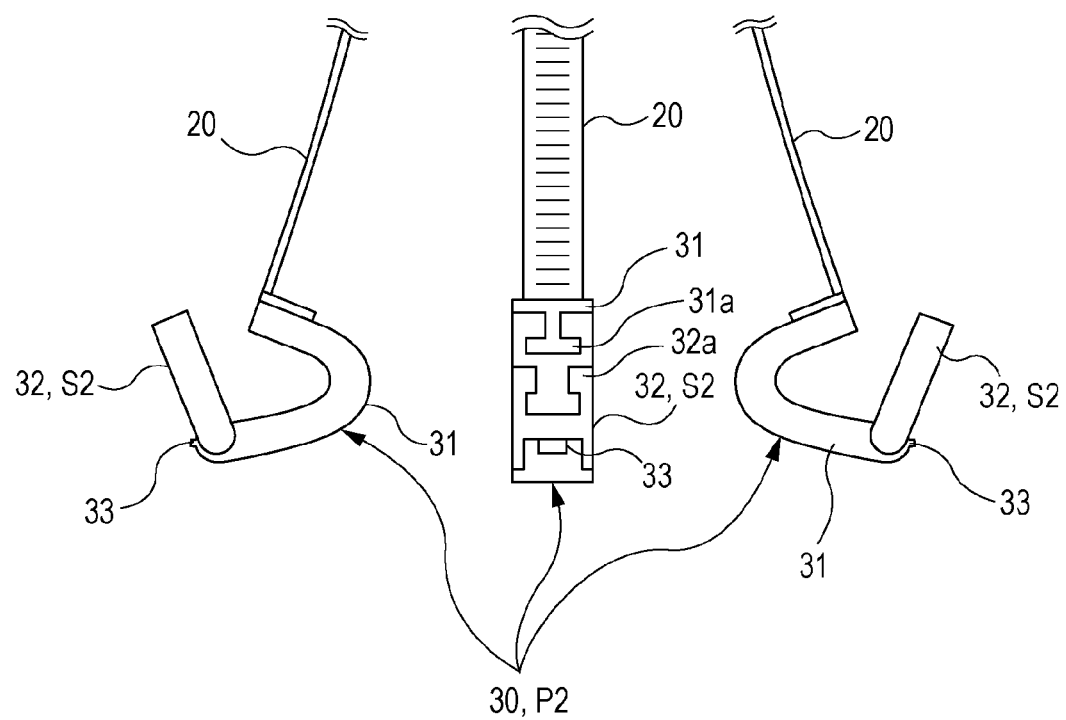
FIG. 7 is a front view (a side view) depicting the cable holders and so forth in the embodiment.
Figure 8A:
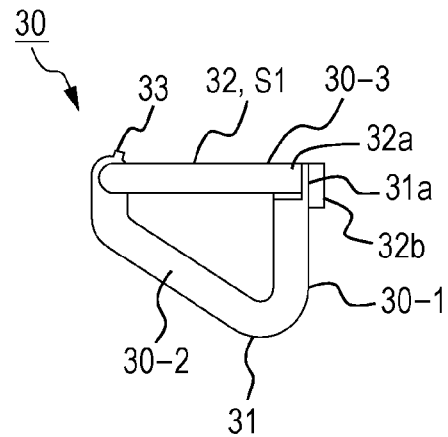
FIG. 8A is a front view depicting the cable holder in the embodiment.
Figure 8B:
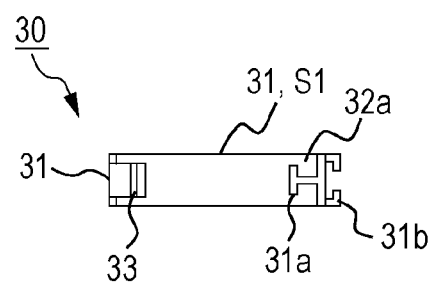
FIG. 8B is a plan view depicting the cable holder in the embodiment.
Figure 8C:
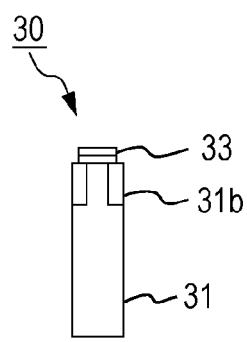
FIG. 8C is a right side view depicting the cable holder in the embodiment.
Figure 9A:
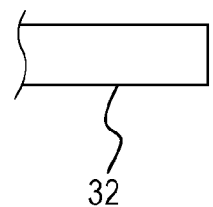
FIG. 9A is a front view depicting a lid of the cable holder in the embodiment.
Figure 9B:
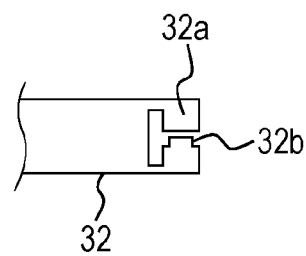
FIG. 9B is a plan view depicting the lid of the cable holder in the embodiment.
Figure 9C:
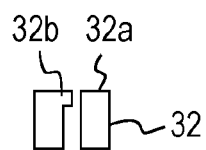
FIG. 9C is a right side view depicting the lid of the cable holder in the embodiment.
Figure 10:
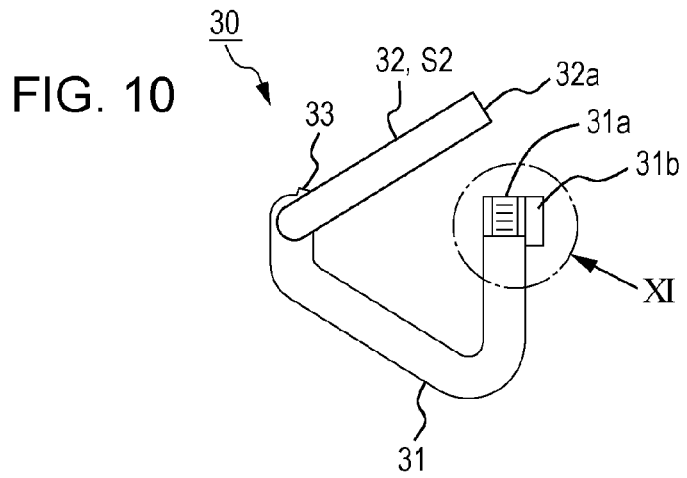
FIG. 10 is a front view depicting the cable holder (in a lid open state) in the embodiment.
Figure 12:
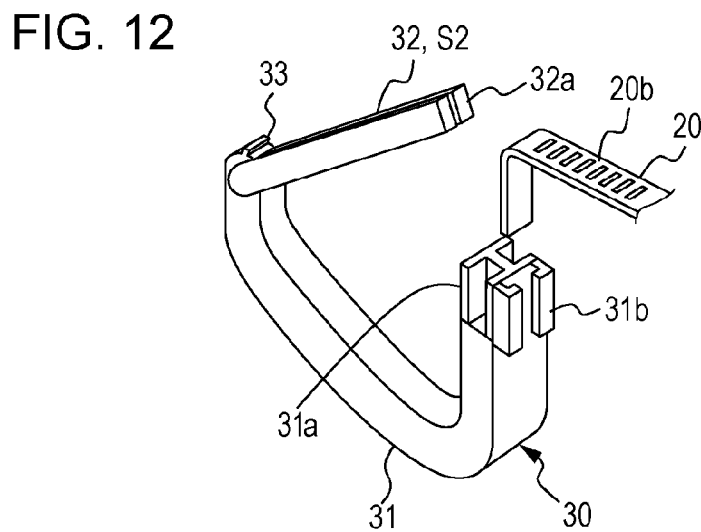
FIG. 12 is a perspective view depicting the cable holder (in a lid open state) in the embodiment.

The lid 32 is in a closed state (S1) depicted in FIGS. 8A and 8B and in an open state (S2) depicted in FIGS. 7, 10, and 12. The lid 32 holds the optical cable 200 with the holder main body 31 in the closed state (S1). In the open state (S2), the lid 32 opens from the side where the holding foot 20 is located in such a way as to receive the optical cable 200 which is inserted along the holding foot 20.

As depicted in FIG. 8A, the cable holder 30 has a virtually triangular shape with two sides 30-1 and 30-2 formed by the holder main body 31 and one side 30-3 formed by the lid 32 (S1) in the closed state. The holder main body 31 may be said to be shaped like the letter U in which parts facing each other have different lengths.

The two sides 30-1 and 30-2 formed by the holder main body 31 are a first side 30-1 parallel to the central shaft section 10 in the position P1 in which the cable is held and a second side 30-2 situated next to the first side. The second side 30-2 becomes parallel to the substrate 101 as the cable holder 30 moves from the position P2 in which the cable is not held to the position P1 in which the cable is held. This allows the cable holder 30 to slide on the substrate 101.

The one side 30-3 formed by the lid 32 is a third side 30-3 that extends from an end (an upper end in FIG. 8A) of the first side 30-1, the end opposite to the substrate 101 in the position P1 in which the cable is held, in such a way as to get away from the central shaft section 10 in a direction orthogonal to the central shaft section 10.

Between the first side 30-1 and the third side 30-3, the holder main body 31 has a main body-side locking portion 31*a* and the lid 32 has a lid-side locking portion 32*a*. The main body-side locking portion 31*a* and the lid-side locking portion 32*a* are fixed to each other.

Figure 11:
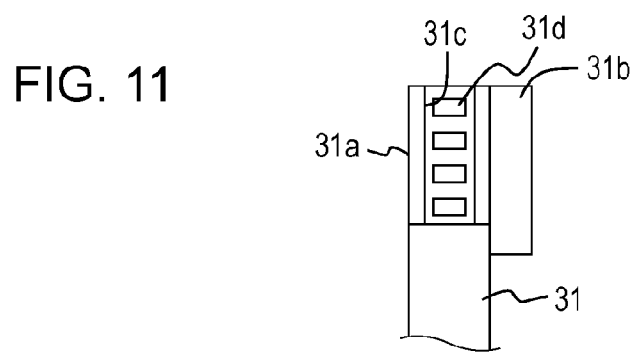
FIG. 11 is an enlarged view of an XI part of FIG. 10.

The main body-side locking portion 31*a* is, for example, a groove 31*c* (see FIG. 11) extending downward from an upper end on the front side and the back side. The lid-side locking portion 32*a* has a cut in the shape of the letter T in a plan view (see FIG. 9B) and is inserted into the groove 31*c* of the main body-side locking portion 31*a* at the right and left tip portions. As depicted in FIG. 11, in the groove 31*c*, depressions 31*d* are continuously provided in a height direction. A projection 32*b* of the lid-side locking portion 32*a* is inserted into any one of the plurality of depressions 31*d* and is fixed thereto. The projection 32*b* projects from, for example, an upper end of one of the right and left tips of the lid-side locking portion 32*a* toward the other of the right and left tips of the lid-side locking portion 32*a*. Incidentally, as a result of a rotation shaft of the lid 32 moving parallel to the groove 31*c* of the holder main body 31, for example, it is possible to adjust easily the position in which the depression 31*d* and the projection 32*b* are fixed.

In the holder main body 31, a holding foot locking section 31*b* is provided near the main body-side locking portion 31*a*. The tip 20*b* of the holding foot 20 is inserted into the holding foot locking section 31*b*, which detachably fixes the holding foot 20 by fitting or other ways, for example. As a result, the cable holder 30 is detachably disposed with respect to the tip 20*b* of the holding foot 20.

As depicted in FIGS. 8A to 8C, 10, and 12, the cable holder 30 further includes a lid supporting convex portion 33. The lid supporting convex portion 33 is provided between the second side 30-2 and the third side 30-3 and supports the lid 32 (S2) in the open state in the position P2 in which the cable is not held. Therefore, the lid supporting convex portion 33 regulates the opening angle of the lid 32.

A portion of the lid supporting convex portion 33 (a contact surface at a right edge in FIG. 10), the portion making contact with the lid 32, faces obliquely upward with respect to a horizontal direction in the position P2 in which the cable is not held (see FIGS. 10 and 12). Moreover, the portion of the lid supporting convex portion 33, the portion making contact with the lid 32, faces in the horizontal direction or obliquely downward with respect to the horizontal direction in the position P1 in which the cable is held (see FIG. 8A; in FIG. 8A, the portion faces obliquely downward with respect to the horizontal direction).

As a result of the cable holder 30 moving from the position P2 in which the cable is not held to the position P1 in which the cable is held, the lid 32 separates from the lid supporting convex portion 33 under its own weight and moves toward the position of the closed state S1.

As depicted in FIGS. 13A to 14B, the holding feet adjusting section 40 includes an adjusting section main body 41 and the engaging section 42. The holding feet adjusting section 40 is placed on the central shaft section 10 and adjusts the length of the holding foot 20 by a fixing position in a length direction (a direction in which the base end 20*a* and the tip 20*b* are connected) of the holding foot 20.

Figure 13A:
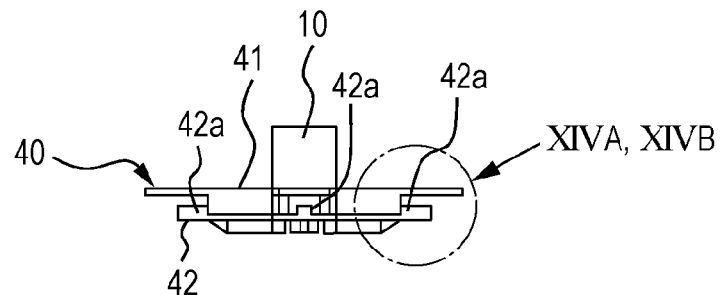
FIG. 13A is a front view (a side view) depicting a holding feet adjusting section in the embodiment.
Figure 13B:
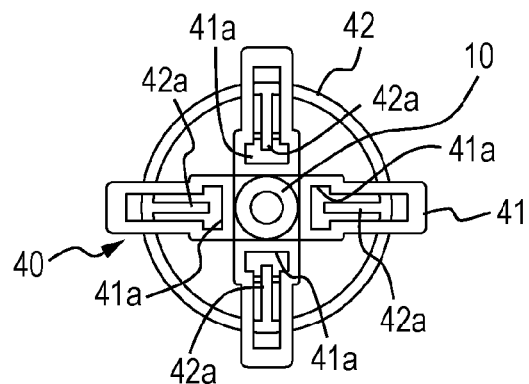
FIG. 13B is a plan view depicting the holding feet adjusting section in the embodiment.
Figure 13C:
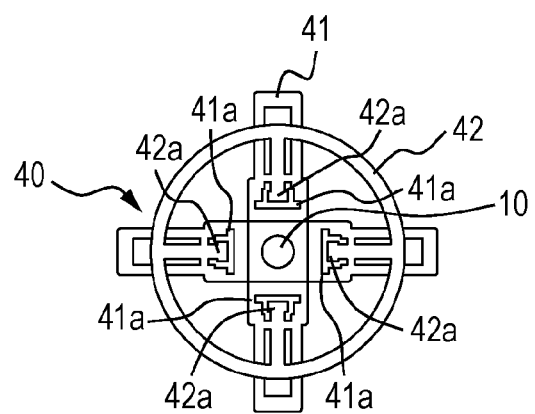
FIG. 13C is a bottom view depicting the holding feet adjusting section in the embodiment.

As depicted in FIG. 13B, the adjusting section main body 41 is formed by making, for example, two long slender plate-like members cross each other in the shape of a cross with the central shaft section 10 placed at the center thereof. In the adjusting section main body 41, four guide holes 41*a* are formed around the central shaft section 10.

The guide hole 41*a* guides the holding foot 20. The guide hole 41*a* is inclined, for example, so that the guide hole 41*a* gets away from the central shaft section 10 as the guide hole 41*a* comes close to an end (a lower end of the guide hole 41*a* in FIG. 14A) on the side of the holding foot 20 where the tip 20*b* is located from an end (an upper end of the guide hole 41*a* in FIG. 14A) on the side of the holding foot 20 where the base end 20*a* is located. As a result, when the cable holder 30 moves from the position P2 in which the cable is not held (see FIGS. 2A and 14A) to the position P1 in which the cable is held (see FIGS. 1 and 14B), the holding foot 20 is easily bent in such a way as to get away from the central shaft section 10 from the base end 20a to the tip 20b.

Figure 14A:
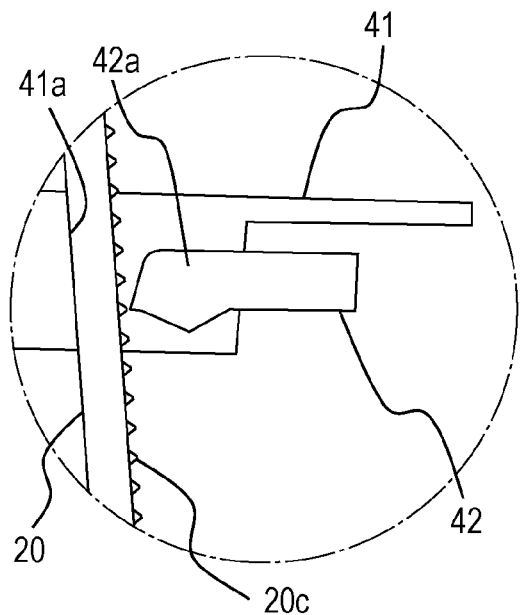
FIG. 14A is an enlarged view (I) depicting an internal structure of a XIVA part of FIG. 13A.
Figure 14B:
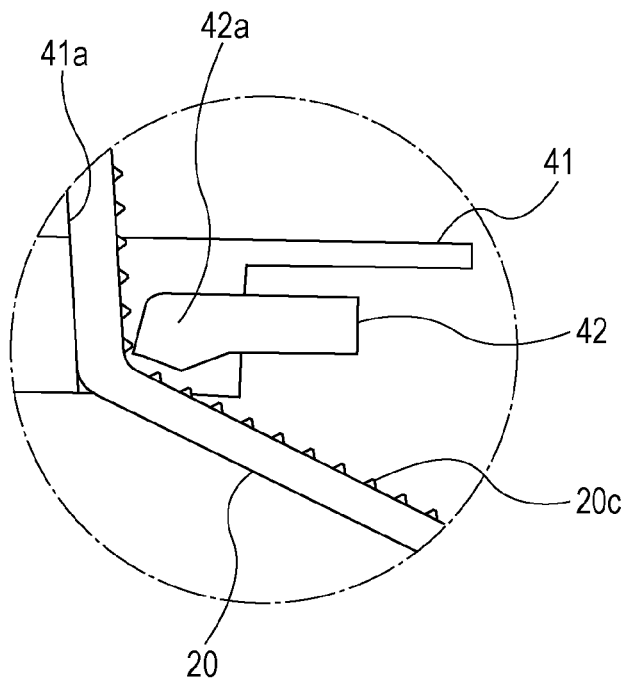
FIG. 14B is an enlarged view (II) depicting an internal structure of a XIVB part of FIG. 13A.

The engaging section 42 has a circular shape with the central shaft section 10 placed at the center thereof and has adjusting levers 42a projecting to the central shaft section 10 toward the corresponding guide holes 41a. The holding feet adjusting section 40 fixes the holding feet 20 by engaging the projections and depressions 20c of the holding feet 20 as depicted in FIG. 14B in the adjusting levers 42a.

Since the four adjusting levers 42a of the engaging section 42 are integrally provided, the holding feet adjusting section 40 collectively adjusts the length of the plurality of holding feet 20. Incidentally, the plurality of adjusting levers 42a may be separated from one another so that individual adjustment may be performed.

As described earlier, the grip section 50 depicted in FIGS. 1 to 4 is an example of the base end fixing section, and collectively ties the plurality of holding feet 20 in a bundle at the base ends 20a and fixes the holding feet 20. The grip section 50 is disposed on the same axis as the central shaft section 10 and has a cylindrical shape in which an opening is provided only on the side where the substrate 101 is located (a lower end in FIG. 1), for example, so that a human hand easily grasps the grip section 50. The grip section 50 is disposed above the central shaft section 10 with a space left between the grip section 50 and the central shaft section 10. This space is provided for adjusting the length of the holding foot 20 by the holding feet adjusting section 40 by moving the grip section 50 parallel to the central shaft section 10.

Figure 15:
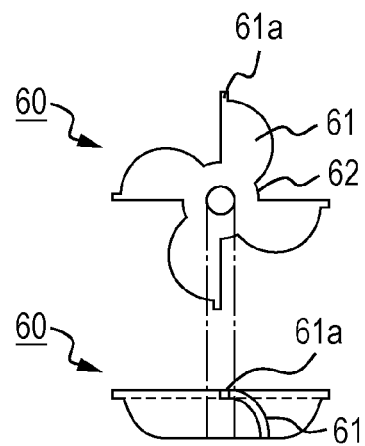
FIG. 15 is a bottom view and a front view (a side view) depicting a holding feet pressing section in the embodiment.

The holding feet pressing section 60 depicted in FIG. 15 has a shape of a windmill, for example, and rotates about the central shaft section 10. The holding feet pressing section 60 presses the plurality of holding feet 20 in such a way as to move the holding feet 20 away from the central shaft section 10. The holding feet pressing section 60 includes a plurality of holding foot pressing blades 61. These holding foot pressing blades 61 integrally rotate to a first position P11 (see FIG. 17E) in which the holding foot pressing blades 61 press the holding feet 20 in such a way as to move the holding feet 20 away from the central shaft section 10 and to a second position P12 (see FIGS. 17A to 17D) moved back from the first position. The holding feet pressing section 60 may be rotated in synchronization with the rotation of the grip section 50 performed by a person, for example.

Between the holding feet pressing blades 61, a plurality of grooves 62 are located. The grooves 62 receive the holding feet 20 when the holding foot pressing blades 61 are in the second position P12.

Each holding foot pressing blade 61 has a rotation regulating projection 61a that makes contact with the holding foot 20 and regulates the rotation by which the holding foot pressing blade 61 strides over the holding foot 20. The rotation regulating projection 61a projects from the holding foot pressing blade 61 in a direction in which the rotation regulating projection 61a gets away from the central shaft section 10, for example.

As depicted in FIG. 15, the holding foot pressing blade 61 may have an upward curve formed from a base end on the side where the groove 62 is located to a tip to lift the holding foot 20 when being rotated from the second position P12 to the first position P11.

Figure 16:
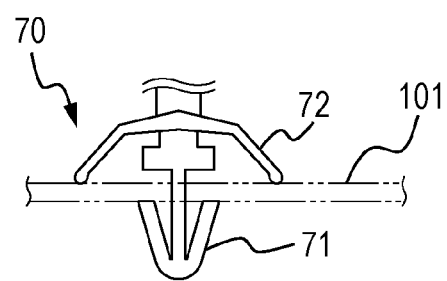
FIG. 16 is a front view depicting a substrate fixing section in the embodiment.

As depicted in FIG. 16, the substrate fixing section 70 includes an arrowhead 71 which is an example of an inserting section and a pressing member 72.

The arrowhead 71 has a tapered shape which is the shape of the letter V, for example, and penetrates the substrate 101 indicated with a virtual line (a chain-double dashed line) in a state in which the arrowhead 71 is provided at one end of the central shaft section 10 and is bent, whereby the sectional area orthogonal to a direction in which the arrowhead 71 penetrates the substrate 101 is reduced.

The pressing member 72 has elasticity and is provided in the central shaft section 10 like a flange, for example, in a position in which the pressing member 72 faces the arrowhead 71 with the substrate 101 sandwiched between the pressing member 72 and the arrowhead 71. The pressing member 72 presses the substrate 101 toward the side where the arrowhead 71 is located. The pressing member 72 has the shape of the letter U having an opening on the side where the substrate 101 is located, for example. In an example of FIG. 16, portions of the pressing member 72 in the shape of the letter U, the portions facing each other, spread in such a way as to get away from each other toward the opening end. Since such a shape allows the pressing member 72 to obtain elasticity like a leaf spring, the pressing member 72 may be made of resin or the like, not a material such as rubber.

FIGS. 17A to 17E are perspective views, each depicting an example of a method for holding the optical cable 200 in the embodiment.

Figure 17A:
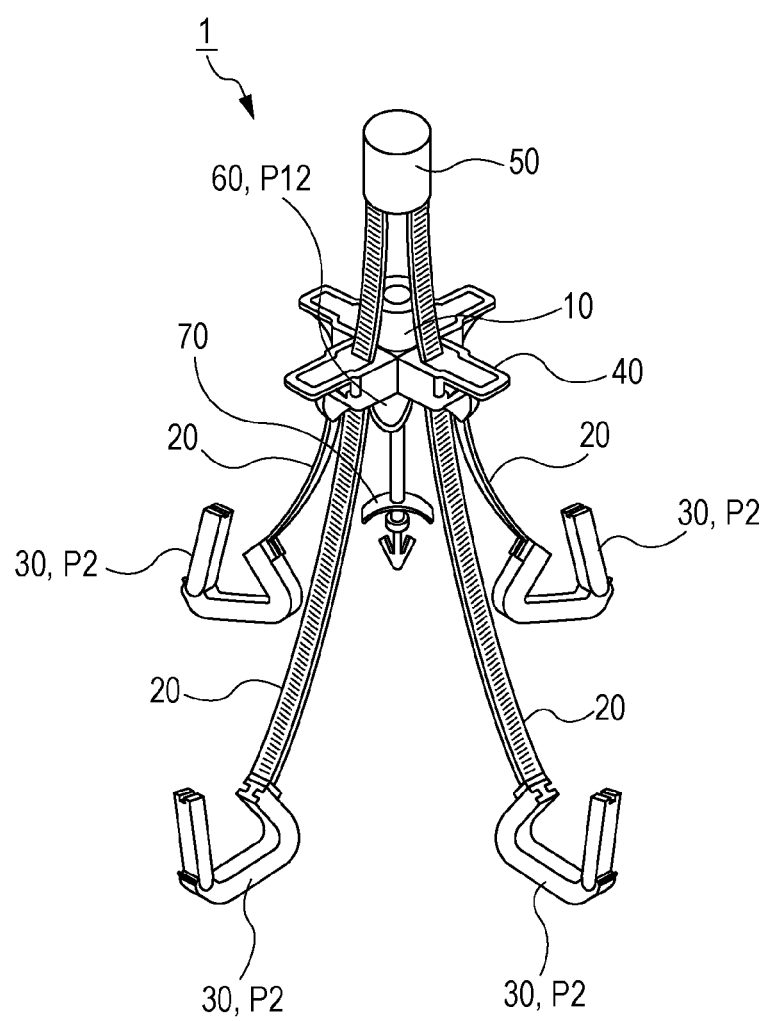
FIG. 17A is a perspective view (I) depicting an example of a method for holding an optical cable in the embodiment.

The optical cable holding device 1 depicted in FIG. 17A is in an initial state. The cable holders 30 are in the position P2 in which the cable is not held, but the holding feet 20 are slightly bent as a result of being tied in a bundle by the grip section 50 and being guided by the above-described guide holes 41a of the holding feet adjusting section 40. The plurality of holding feet 20 are in a state in which the holding feet 20 are not much away from the central shaft section 10 like the ribs (the parts that spread radially) of a closed umbrella. As a result, the plurality of cable holders 30 are in the position P2 in which the cable is not held, the position P2 which is closer to the central shaft section 10 than the position P1 in which the cable is held.

Figure 17B:
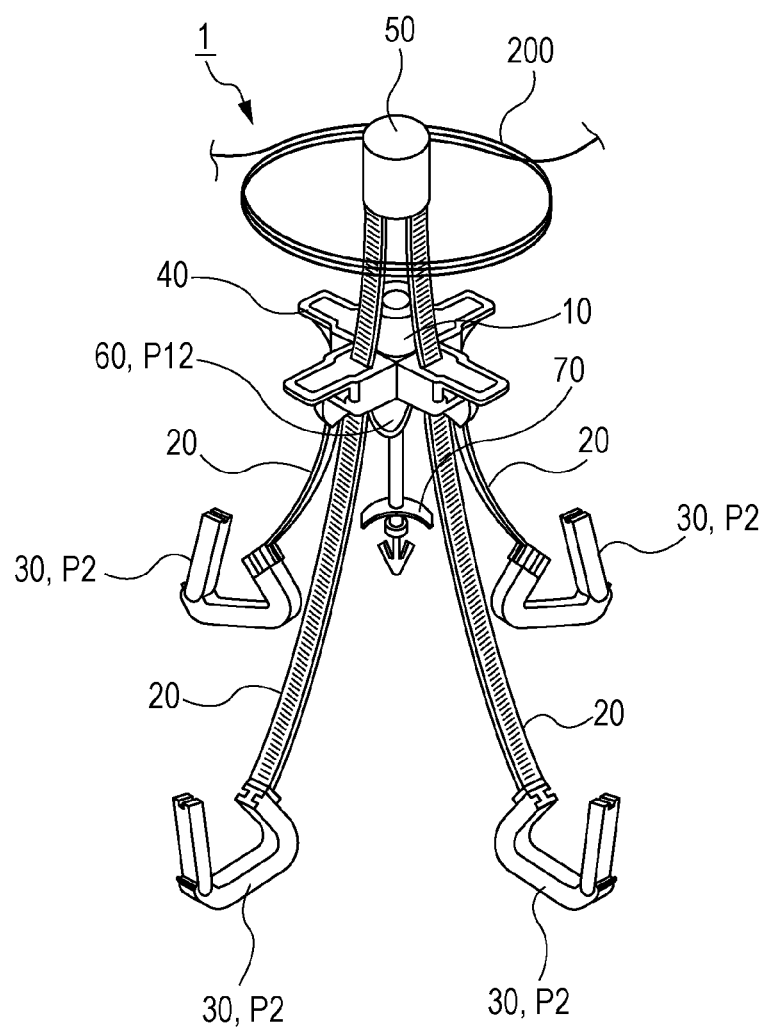
FIG. 17B is a perspective view (II) depicting the example of the method for holding an optical cable in the embodiment.

Next, as depicted in FIG. 17B, the optical cable 200 is disposed, like a quoit, around the grip section 50 and the holding feet adjusting section 40 with the grip section 50 placed at the center thereof in a state in which, for example, the radius of curvature thereof is less than or equal to a prescribed radius of curvature and the optical cable 200 has an appropriate circular shape that is made in an offhand manner.

Figure 17C:
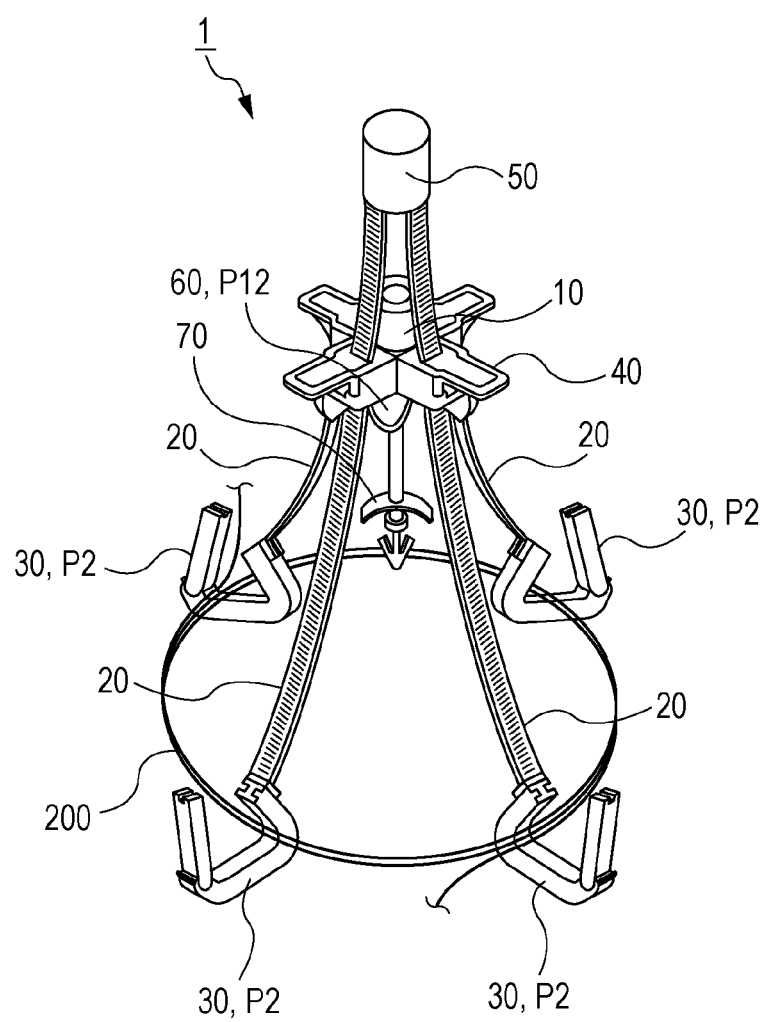
FIG. 17C is a perspective view (III) depicting the example of the method for holding an optical cable in the embodiment.

As depicted in FIG. 17C, the optical cable 200 is inserted into the cable holders 30 by being guided by the holding feet 20.

Figure 17D:
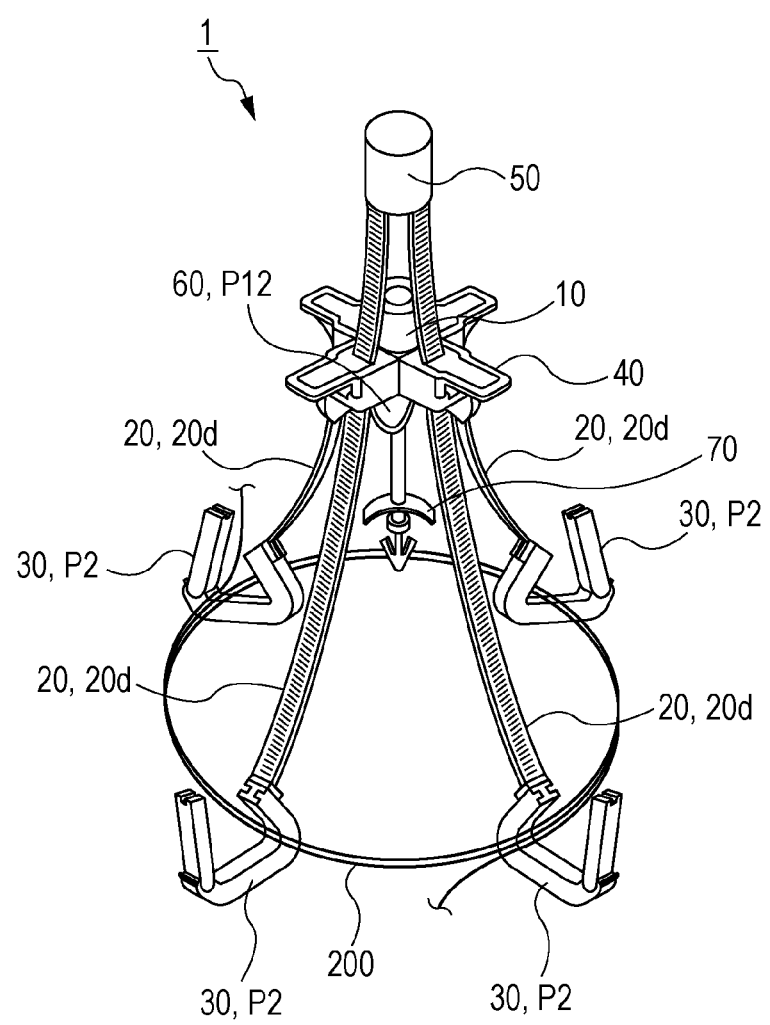
FIG. 17D is a perspective view (IV) depicting the example of the method for holding an optical cable in the embodiment.

Then, a person adjusts the length of the holding feet 20 from the holding feet adjusting section 40 to the tips 20b by moving the grip section 50 parallel to the central shaft section 10 (performing up-and-down movement in FIG. 17D) while seeing the tick marks 20d depicted in FIG. 17D in an upper part of the holding feet adjusting section 40, for example. By so doing, it is possible to adjust the radius of curvature of the optical cable 200 when the cable holders 30 are in the position P1 in which the cable is held.

Figure 17E:
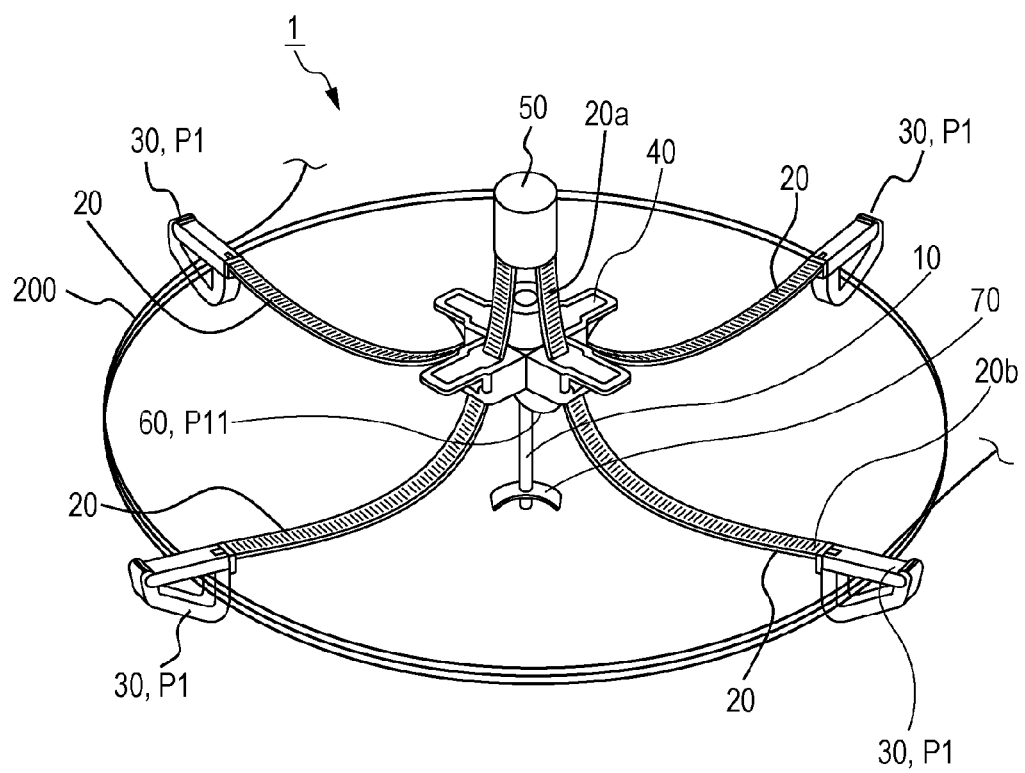
FIG. 17E is a perspective view (V) depicting the example of the method for holding an optical cable in the embodiment.

Next, as depicted in FIG. 17E, the person presses the grip section 50 against the central shaft section 10 and holds the grip section 50 down toward the substrate 101 together with the central shaft section 10 while pressing the grip section 50 against the central shaft section 10. As a result, the arrowhead 71 of the substrate fixing section 70 is inserted into the central shaft section 10 and, as described earlier, the optical cable holding device 1 is fixed to the substrate 101 by the substrate fixing section 70.

Moreover, the holding feet 20 are bent to a larger extent as compared to the initial state depicted in FIG. 17A in such a way as to get away from the central shaft section 10 and become parallel to the substrate 101 at the tips 20b. This makes the cable holders 30 move to the position P1 in which the cable is held. Then, as described earlier, each lid 32 moves to the closed state S1 under its own weight, whereby the holder main body 31 and the lid 32 are temporarily fixed. This keeps the optical cable 200 from coming free from the cable holders 30. Then, for example, the person finally locks the holder main bodies 31 and the lids 32 manually.

Figure 18:
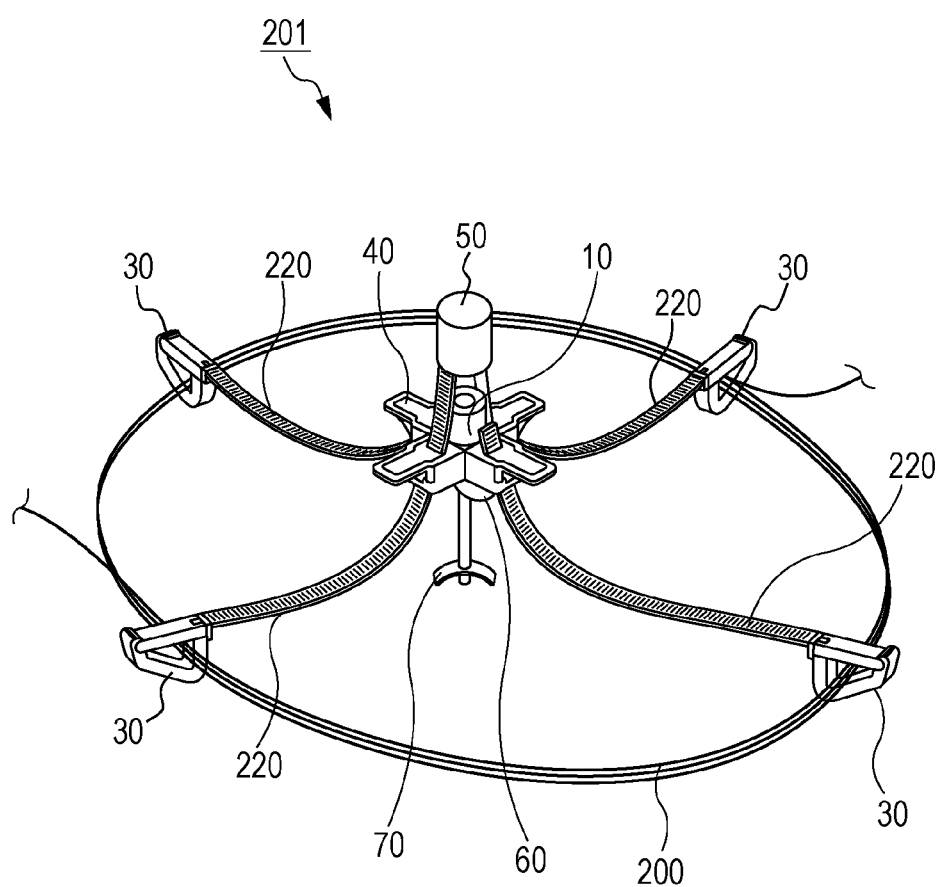
FIG. 18 is a perspective view depicting an optical cable holding device according to a first modified example of the embodiment.

FIG. 18 is a perspective view depicting an optical cable holding device 201 according to a first modified example of the embodiment.

The optical cable holding device 201 according to the first modified example differs from the optical cable holding device 1 depicted in FIG. 1 and other drawings only in that a plurality of holding feet 220 are disposed in such a way as to be separable from one another.

As in the case of the holding feet 20 depicted in FIG. 1, the holding feet 220 are also collectively tied in a bundle by the grip section 50, but the holding feet 220 are detachable from the grip section 50. As a result, the holding feet 220 are disposed in such a way as to be separable from one another. To dispose the holding feet 220 in a separable manner, the grip section 50 may be omitted.

The holding feet adjusting section 40 adjusts the holding feet 220 to have different lengths. As a result, as depicted in FIG. 18, the flexibility of a method for holding the optical cable 200 is increased and the optical cable 200 is rotatable in the shape of an ellipse, for example.

Figure 19:
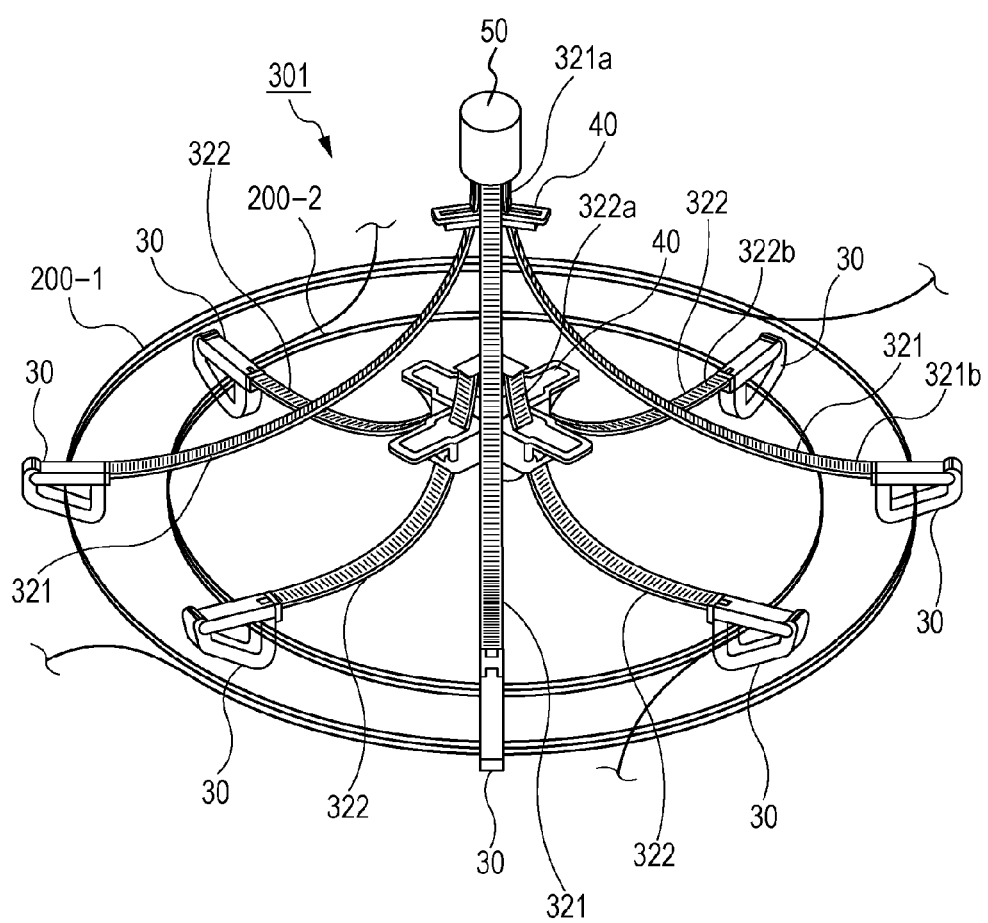
FIG. 19 is a perspective view depicting an optical cable holding device according to a second modified example of the embodiment.

FIG. 19 is a perspective view depicting an optical cable holding device 301 according to a second modified example of the embodiment.

The optical cable holding device 301 according to the second modified example differs from the optical cable holding device 1 depicted in FIG. 1 and other drawings in that, in place of a plurality of (for example, four) holding feet 20, the optical cable holding device 301 includes a plurality of (for example, four) first holding feet 321 and a plurality of (for example, four) second holding feet 322.

The holding feet adjusting section 40 and the holding feet pressing section 60 and a collective fixing section, an example of which is the grip section 50, may be disposed for the plurality of first holding feet 321 and for the plurality of second holding feet 322. The central shaft section 10 may be shared among the plurality of first holding feet 321 and the plurality of second holding feet 322.

A base end 321a of each first holding foot 321 is located above a base end 322a of each second holding foot 322.

A tip 321b of each first holding foot 321 and a tip 322b of each second holding foot 322 differ from each other in the distance from the central shaft section 10. In an example of FIG. 19, since the first holding foot 321 is longer than the second holding foot 322, the tip 321b of the first holding foot 321 is located farther away from the central shaft section 10 than the tip 322b of the second holding foot 322, but the tip 321b of the first holding foot 321 may be located closer to the central shaft section 10 than the tip 322b of the second holding foot 322.

As a result, it is possible to hold optical cables 200 having different diameters: an optical cable 200-1 held by the plurality of first holding feet 321 and an optical cable 200-2 held by the plurality of second holding feet 322.

Figure 20:
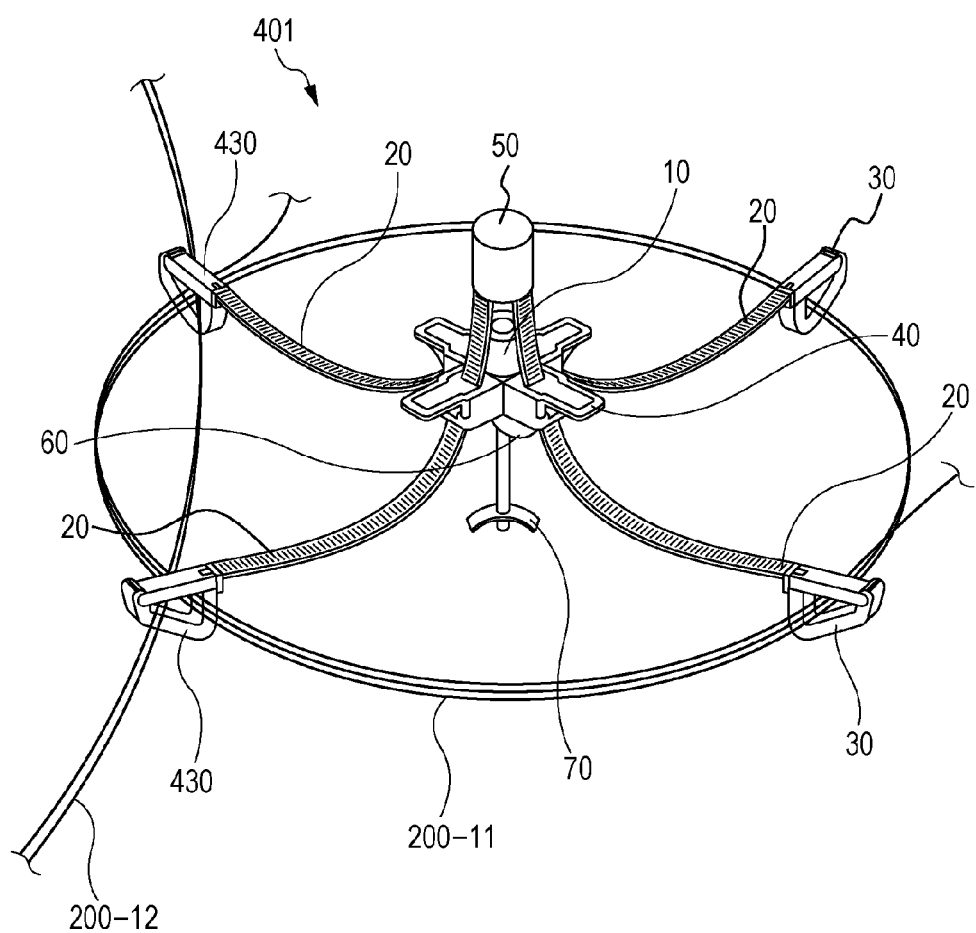
FIG. 20 is a perspective view depicting an optical cable holding device according to a third modified example of the embodiment.
Figure 21:
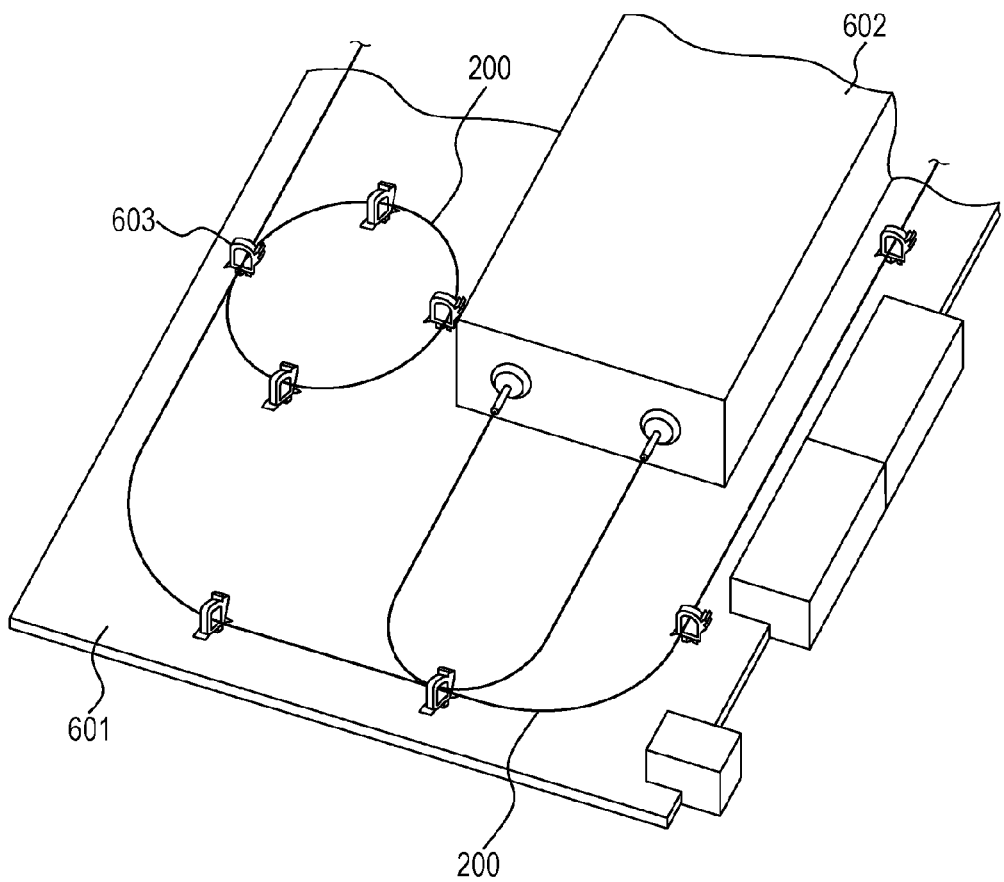
FIG. 21 is a perspective view for describing an example of handling of an extra length of an optical cable.
Figure 22:
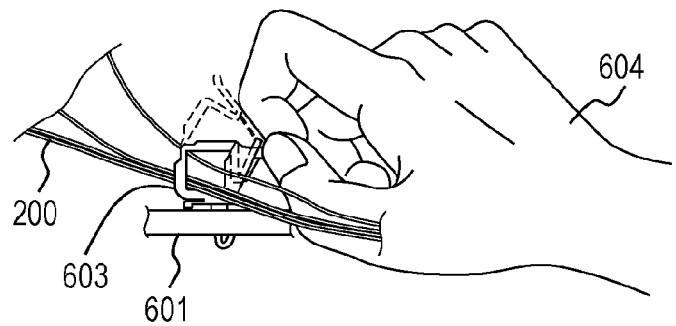
FIG. 22 is a front view (I) for describing an example of a method for unlocking a cable holder.
Figure 23:
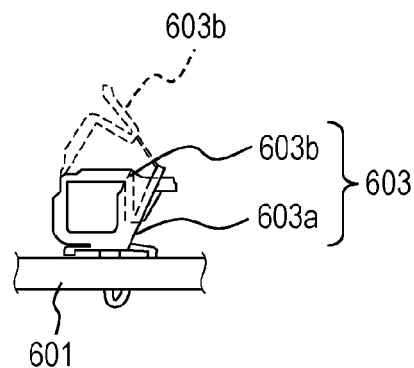
FIG. 23 is a front view (II) for describing the example of the method for unlocking a cable holder.
Figure 24:
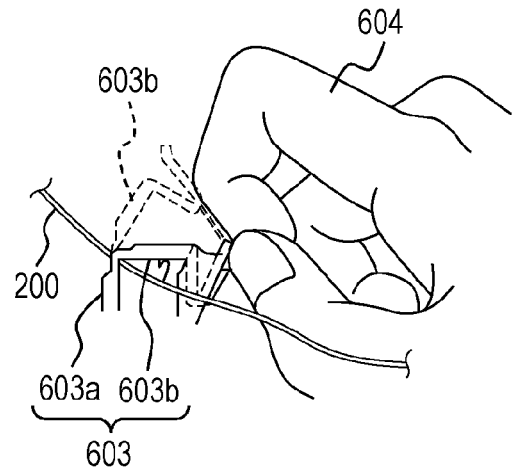
FIG. 24 is a front view (III) for describing the example of the method for unlocking a cable holder.

FIG. 20 is a perspective view depicting an optical cable holding device 401 according to a third modified example of the embodiment.

The optical cable holding device 401 according to the third modified example includes different types of cable holders 30 and 430 (for example, a plurality of types of cable holders with openings having different shapes). Two cable holders 430 with large openings are situated next to each other. Two cable holders 30 with relatively small openings are also situated next to each other. In addition to an optical cable 200-11 which the cable holders 430 with relatively large openings hold together with the cable holders 30, the cable holders 430 also hold another optical cable 200-12.

By disposing a component element, such as the holding foot locking section 31b depicted in FIG. 12, that detachably fixes the holding foot 20, it is possible to change the cable holders 30 and the cable holders 430 with ease.

In the embodiment described above, a plurality of flexible holding feet 20 are disposed so as to spread radially from the central shaft section 10, extend from the base ends 20a on the side where the central shaft section 10 is located toward the side where the substrate 101 is located, and are bent in such a way as to get away from the central shaft section 10 as the holding feet 20 get closer to the tips 20b which are free ends. The cable holders 30 are disposed independently of the substrate 101 at the tips 20b of the holding feet 20 and hold the optical cable 200. As a result, as compared to when the cable holders 30 are fixed on the substrate 101 in a movable or immovable manner, it is possible to keep the cable holders 30 from hindering high-density mounting of the substrate 101. Therefore, according to the embodiment, it is possible to handle an extra length of the optical cable 200 while keeping high-density mounting from being hindered.

Moreover, in the embodiment, the holding feet adjusting section 40 is placed on the central shaft section 10 and adjusts the length of the holding foot 20 by a fixing position in a length direction in which the base end 20a and the tip 20b of the holding foot 20 are connected. This makes it possible to keep high-density mounting from being hindered and absorb variations in extra length of the optical cable 200 caused by extra length tolerances or the like of the optical cable 200. Furthermore, as described earlier, the cable holders 30 are disposed independently of the substrate 101. As a result, unlike an existing method by which a spare cable holder mounting hole is provided in the substrate 101 to absorb variations in extra length of the optical cable 200, it is also possible to keep the cable holders from hindering high-density mounting of the substrate 101 over a wide range. In addition, since it is possible to omit examination of a detailed route of the optical cable 200 at the time of examination before component mounting, it is also possible to reduce the number of design man-hours.

Furthermore, in the embodiment, the holding feet adjusting section 40 collectively adjusts the length of the plurality of holding feet 20. For example, the holding feet adjusting section 40 has a plurality of adjusting levers 42a engaging the holding feet 20, the adjusting levers 42a integrally provided in the engaging section 42. This makes it possible to handle an extra length of the optical cable 200 with ease.

In addition, in the embodiment, the holding feet adjusting section 40 includes the guide holes 41a that guide the holding feet 20, and the guide holes 41a get away from the central shaft section 10 as the guide holes 41a come closer to the ends of the holding feet 20 on the side where the tips 20b are located from the ends of the holding feet 20 on the side where the base ends 20a are located. This makes it possible to make the holding feet 20 easily bendable in such a way as to get away from the central shaft section 10 from the base ends 20a to the tips 20b.

Moreover, in the embodiment, the holding feet 20 each include projections and depressions 20c formed at least in part in a length direction. Furthermore, the holding feet adjusting section 40 includes the engaging section 42 that fixes the holding feet 20 by engaging the projections and depressions 20c. This makes it possible to absorb variations in extra length of the optical cable 200 with a simple structure.

Furthermore, in the embodiment, the base end fixing section, an example of which is the grip section 50, fixes the plurality of holding feet 20 by tying the holding feet 20 in a bundle at the base ends 20a. As a result of the plurality of holding feet 20 being bundled together, it is possible to handle an extra length of the optical cable 200 reliably with a simple structure.

In addition, in the embodiment, the holding feet pressing section 60 rotates about the central shaft section 10 and presses the plurality of holding feet 20 in such a way as to move the holding feet 20 away from the central shaft section 10. Moreover, the holding feet pressing section 60 includes a plurality of holding foot pressing blades 61 that integrally rotate to the first position P11 in which the holding foot pressing blades 61 press the holding feet 20 in such a way as to move the holding feet 20 away from the central shaft section 10 and to the second position P12 moved back from the first position. This makes it possible to make the holding feet 20 easily bendable in such a way as to get away from the central shaft section 10 from the base ends 20a to the tips 20b.

Furthermore, in the embodiment, the holding feet pressing section 60 includes a plurality of grooves 62 located between the holding foot pressing blades 61. These grooves 62 receive the holding feet 20 when the holding foot pressing blades 61 are in the second position P12. Moreover, the holding foot pressing blades 61 each have the rotation regulating projection 61a that makes contact with the holding foot 20 and regulates the rotation by which the holding foot pressing blade 61 strides over the holding foot 20. This makes it possible to allow the holding feet pressing section 60 to bend the holding feet 20 with a simple structure.

In addition, in the embodiment, the cable holders 30 each include the holder main body 31 and the lid 32. The lid 32 is in the closed state S1 in which the lid 32 holds the optical cable 200 together with the holder main body 31 and in the open state S2 in which the lid 32 opens from the side where the holding foot 20 is located in such a way as to receive the optical cable 200 that is inserted along the holding foot 20. This makes it possible to handle an extra length of the optical cable 200 with ease.

Moreover, in the embodiment, the cable holders 30 are in the position P1 in which the cable is held and in the position P2 in which the cable is not held, the position P2 that is closer to the central shaft section 10 than the position P1 in which the cable is held. Each cable holder 30 has a virtually triangular shape with two sides formed by the holder main body 31 and one side formed by the lid 32 (S1) in the closed state. The two sides formed by the holder main body 31 are the first side 30-1 parallel to the central shaft section 10 in the position P1 in which the cable is held and the second side 30-2 situated next to the first side 30-1. Furthermore, the one side formed by the lid 32 is the third side 30-3 that extends from an end of the first side 30-1, the end opposite to the substrate 101 in the position P1 in which the cable is held, in such a way as to get away from the central shaft section 10 in a direction orthogonal to the central shaft section 10. As a result, the first side 30-1 keeps the holding foot 20 from being located along the substrate 101. With the third side 30-3, the optical cable 200 is allowed to be received by the cable holder 30 easily.

In addition, in the embodiment, the cable holders 30 each further include the lid supporting convex portion 33 that supports the lid 32 (S2) in the open state in the position P2 in which the cable is not held. Moreover, a portion of the lid supporting convex portion 33, the portion making contact with the lid 32, faces obliquely upward with respect to the horizontal direction in the position P2 in which the cable is not held and faces in the horizontal direction or obliquely downward with respect to the horizontal direction in the position P1 in which the cable is held. Furthermore, as a result of the cable holder 30 moving from the position P2 in which the cable is not held to the position P1 in which the cable is held, the lid 32 separates from the lid supporting convex portion 33 under its own weight and moves toward the position of the closed state S1. As a result, it is possible to move the lid 32 automatically to the closed state S1 and therefore perform handling of an extra length and temporary fixing of the lid 32 in one operation. This makes it possible to handle an extra length of the optical cable 200 with ease.

Moreover, in the embodiment, the cable holders 30 are detachably disposed with respect to the tips 20b of the holding feet 20. As a result, it is possible to absorb variations in extra length of the optical cable 200 with a simple structure. Furthermore, since the cable holders 30 are not fixed to the substrate 101, it is also possible to keep restrictions, such as restrictions put on a usable cable holder 30 by the mounting hole of the substrate 101, from being put. In addition, in the past, different cable holders 30 have been used based on the density of the optical cable 200; however, it becomes possible to handle an extra length with ease in terms of the use of different cable holders 30.

Moreover, in the embodiment, the substrate fixing section 70 includes the inserting section, an example of which is the arrowhead 71, and the pressing member 72. The inserting section has a tapered shape and penetrates the substrate 101 in a state in which the inserting section is provided at one end of the central shaft section 10 and is bent. The pressing member 72 has elasticity, is provided in the central shaft section 10 in a position in which the pressing member 72 faces the inserting section with the substrate 101 sandwiched between the pressing member 72 and the inserting section, and presses the substrate 101 toward the side where the inserting section is located. As a result, it is possible to handle an extra length of the optical cable 200 with a simple structure. Furthermore, it is possible to use the substrate fixing section 70 also for substrates 101 with different thicknesses.

In addition, in the embodiment, the plurality of holding feet 20 each include the tick marks 20d formed at least in part in the length direction in which the base end 20a and the tip 20b of the holding foot 20 are connected. Each tick mark 20d indicates the radius of the optical cable 200 held by the plurality of cable holders 30 or the information regarding the radius. This makes it possible to handle an extra length of the optical cable 200 with ease.

Moreover, in the first modified example of the embodiment, the plurality of holding feet 220 are disposed in such a way as to be separable from one another, and the holding feet adjusting section 40 adjusts the holding feet 220 to have different lengths. This makes it possible to absorb variations in extra length of the optical cable 200 with a simple structure.

Furthermore, in the second modified example of the embodiment, the base ends 321a of the plurality of first holding feet 321 are located above the base ends 322a of the plurality of second holding feet 322. In addition, the tips 321b of the first holding feet 321 and the tips 321b of the second holding feet 322 differ from each other in the distance from the central shaft section 10. As a result, by sharing the central shaft section 10 among the plurality of first holding feet 321 and the plurality of second holding feet 322, for example, it is possible to keep more effectively high-density mounting from being hindered.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical cable holding device comprising:
a central shaft section fixed to a substrate so as to stand on the substrate;
a plurality of flexible holding feet that are disposed so as to spread radially from the central shaft section, each flexible holding foot extending from a base end on a side where the central shaft section is located, toward a side where the substrate is located and being bent so as to get away from the central shaft section as the flexible holding foot gets closer to a tip which is a free end;
a plurality of cable holders that are disposed independently of the substrate at the tips of the flexible holding feet and hold an optical cable; and
a flexible holding feet adjusting section that is placed on the central shaft section and adjusts a length of the flexible holding foot by a fixing position in a length direction in which the base end and the tip of the flexible holding foot are connected.

2. The optical cable holding device according to claim 1, wherein the holding feet adjusting section collectively adjusts a length of the plurality of flexible holding feet.

3. The optical cable holding device according to claim 1, wherein the holding feet adjusting section includes a guide hole that guides the flexible holding foot, and
the guide hole gets away from the central shaft section as the guide hole gets closer to an end of the flexible holding foot on a side where the tip is located from an end of the flexible holding foot on a side where the base end is located.

4. The optical cable holding device according to claim 1, wherein the flexible holding foot includes projections and depressions formed at least in part in the length direction, and
the flexible holding feet adjusting section includes an engaging section that fixes the flexible holding foot by engaging the projections and depressions.

5. The optical cable holding device according to claim 1, further comprising:
a base end fixing section that ties the plurality of flexible holding feet in a bundle at the base ends and fixes the flexible holding feet.

6. The optical cable holding device according to claim 1, wherein the plurality of flexible holding feet are disposed so as to be separable from one another, and
the flexible holding feet adjusting section adjusts the plurality of flexible holding feet to have different lengths.

7. The optical cable holding device according to claim 1, further comprising:
a flexible holding feet pressing section that rotates about the central shaft section and presses the plurality of flexible holding feet so as to move the flexible holding feet away from the central shaft section,
wherein the flexible holding feet pressing section includes a plurality of flexible holding foot pressing blades that integrally rotate to a first position in which the flexible holding foot pressing blades press the plurality of flexible holding feet so as to move the flexible holding feet away from the central shaft section and to a second position moved back from the first position.

8. The optical cable flexible holding device according to claim 7,
wherein the flexible holding feet pressing section further includes a plurality of grooves located between the plurality of flexible holding foot pressing blades,
the plurality of grooves receive the flexible holding feet when the plurality of flexible holding foot pressing blades are in the second position, and
the flexible holding foot pressing blades each include a rotation regulating projection that makes contact with the flexible holding foot and regulates rotation by which the flexible holding foot pressing blade strides over the flexible holding foot.

9. The optical cable holding device according to claim 1,
wherein the cable holders each include a holder main body and a lid that is in a closed state in which the lid holds the optical cable together with the holder main body and in an open state in which the lid opens from a side where the flexible holding foot is located so as to receive the optical cable that is inserted along the flexible holding foot.

10. The optical cable holding device according to claim 9,
wherein the cable holders are in a position in which a cable is held and in a position in which a cable is not held, the position that is closer to the central shaft section than the position in which a cable is held,
the cable holders each have a virtually triangular shape with two sides formed by the holder main body and one side formed by the lid in the closed state,
the two sides formed by the holder main body are a first side parallel to the central shaft section in the position in which a cable is held and a second side situated next to the first side, and
the one side formed by the lid is a third side that extends from an end of the first side, the end opposite to the substrate in the position in which a cable is held, so as to get away from the central shaft section in a direction orthogonal to the central shaft section.

11. The optical cable holding device according to claim 10,
wherein the cable holders each further include a lid supporting convex portion that supports the lid in the open state in the position in which a cable is not held,
a portion of the lid supporting convex portion, the portion making contact with the lid, faces obliquely upward with respect to a horizontal direction in the position in which a cable is not held and faces in the horizontal direction or obliquely downward with respect to the horizontal direction in the position in which a cable is held, and
as a result of the cable holder moving from the position in which a cable is not held to the position in which a cable is held, the lid separates from the lid supporting convex portion under an own weight thereof and moves toward the position of the closed state.

12. The optical cable holding device according to claim 1,
wherein the cable holders are detachably disposed with respect to the tips of the flexible holding feet.

13. The optical cable holding device according to claim 1, further comprising:
a substrate fixing section including an inserting section having a tapered shape and penetrating the substrate in a state in which the inserting section is provided at an end of the central shaft section and is bent and a pressing member having elasticity, the pressing member provided in the central shaft section in a position in which the pressing member faces the inserting section with the substrate sandwiched between the pressing member and the inserting section, the pressing member pressing the substrate toward a side where the inserting section is located.

14. The optical cable holding device according to claim 1, wherein the plurality of flexible holding feet each include tick marks formed at least in part in a length direction in which the base end and the tip of the flexible holding foot are connected, and each tick mark indicates a radius of the optical cable held by the plurality of cable holders or information regarding the radius.

15. The optical cable holding device according to claim 1, wherein the plurality of flexible holding feet include a plurality of first flexible holding feet and a plurality of second flexible holding feet, the base ends of the plurality of first flexible holding feet are located above the base ends of the plurality of second flexible holding feet, and tips of the plurality of first flexible holding feet and tips of the plurality of second flexible holding feet differ from each other in a distance from the central shaft section.

16. An electronic device comprising:

a substrate;

a central shaft section fixed to the substrate so as to stand on the substrate;

a plurality of flexible holding feet that are disposed so as to spread radially from the central shaft section, each flexible holding foot extending from a base end on a side where the central shaft section is located toward a side where the substrate is located and being bent so as to get away from the central shaft section as the flexible holding foot gets closer to a tip which is a free end;

a plurality of cable holders that are disposed independently of the substrate at the tips of the flexible holding feet and hold an optical cable; and a flexible holding feet adjusting section that is placed on the central shaft section and adjusts a length of the flexible holding foot by a fixing position in a length direction in which the base end and the tip of the flexible holding foot are connected.

17. The optical cable holding device according to claim 1, wherein the plurality of cable holders are provided, with respect to the substrate, on the same side as the side where the plurality of flexible holding feet are provided.

18. The electronic device according to claim 16, wherein the plurality of cable holders are provided, with respect to the substrate, on the same side as the side where the plurality of flexible holding feet are provided.

* * * * *